(12) United States Patent
Flockhart et al.

(10) Patent No.: US 6,754,333 B1
(45) Date of Patent: Jun. 22, 2004

(54) WAIT TIME PREDICTION ARRANGEMENT FOR NON-REAL-TIME CUSTOMER CONTACTS

(75) Inventors: Andrew D. Flockhart, Thornton, CO (US); Michael Joseph Harris, Toms River, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 671 days.

(21) Appl. No.: 09/641,403

(22) Filed: Aug. 17, 2000

Related U.S. Application Data

(60) Provisional application No. 60/200,520, filed on Apr. 27, 2000.

(51) Int. Cl.[7] .............................................. H04M 5/00
(52) U.S. Cl. ............................ 379/266.01; 379/266.06; 379/265.01; 379/265.02; 379/265.09; 379/309
(58) Field of Search ....................... 379/265.01–265.14, 379/266.01–266.1

(56) References Cited

U.S. PATENT DOCUMENTS

| | | | | |
|---|---|---|---|---|
| 5,155,761 A | * | 10/1992 | Hammond .................... | 379/67 |
| 5,206,903 A | | 4/1993 | Kohler et al. ................ | 379/309 |
| 5,506,898 A | | 4/1996 | Costantini et al. .......... | 379/266 |
| 5,592,378 A | | 1/1997 | Cameron et al. ........... | 395/227 |
| 5,594,726 A | | 1/1997 | Thompson et al. ......... | 370/485 |
| 5,606,361 A | | 2/1997 | Davidsohn et al. ........... | 348/14 |
| 5,627,884 A | * | 5/1997 | Williams et al. ............... | 379/88 |
| 5,684,872 A | | 11/1997 | Flockhart et al. ........... | 379/266 |
| 5,724,092 A | | 3/1998 | Davidsohn et al. ........... | 348/14 |
| 5,740,238 A | | 4/1998 | Flockhart et al. ........... | 379/221 |
| 5,751,707 A | | 5/1998 | Voit et al. .................... | 370/384 |
| 5,754,639 A | | 5/1998 | Flockhart et al. ........... | 379/221 |
| 5,790,677 A | | 8/1998 | Fox et al. ...................... | 380/24 |
| 5,828,747 A | | 10/1998 | Fisher et al. ................. | 379/309 |
| 5,839,117 A | | 11/1998 | Cameron et al. ............. | 705/27 |
| 5,875,437 A | | 2/1999 | Atkins .......................... | 705/40 |
| 5,880,720 A | | 3/1999 | Iwafune et al. ............. | 345/327 |
| 5,884,032 A | * | 3/1999 | Bateman et al. ....... | 395/200.34 |
| 5,897,622 A | | 4/1999 | Blinn et al. .................... | 705/26 |
| 5,903,877 A | | 5/1999 | Berkowitz et al. ............ | 705/26 |

(List continued on next page.)

FOREIGN PATENT DOCUMENTS

| | | | |
|---|---|---|---|
| EP | 0 829 996 A2 | 3/1998 | ............ H04M/3/50 |
| EP | 0 866 407 A1 | 9/1998 | ........... G06F/17/30 |
| WO | WO 97/28635 | 8/1997 | .......... H04M/11/00 |

OTHER PUBLICATIONS

Doo–Hyun Kim et al. "Collaborative Multimedia Middleware Architecture and Advanced Internet Call Center"; ProceedingsInternational Conference on Information Networking (Jan. 31, 2001), pp. 246–250.

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

Primary Examiner—William J. Deane, Jr.
(74) Attorney, Agent, or Firm—Sheridan Ross P.C.

(57) ABSTRACT

The present invention is directed to a contact center and methodology for servicing non-real-time contacts. The advance time for the non-real-time contacts is determined by subtracting the time of service for an earlier item from the time of service for a later item. Items that are serviced immediately after certain types of predetermined events, e.g., the queue containing the non-real-time contacts has no working agents; the queue is empty; the system clock is changed; and the system is rebooted are ignored in estimating the wait time for enqueued items. Using this methodology, accurate wait-time predictions are provided for more efficient management of the contact center.

45 Claims, 3 Drawing Sheets

U.S. PATENT DOCUMENTS

| | | | |
|---|---|---|---|
| 5,905,793 A | 5/1999 | Flockhart et al. | 379/266 |
| 5,982,873 A | 11/1999 | Flockhart et al. | 379/266 |
| 6,000,832 A | 12/1999 | Franklin et al. | 364/479.02 |
| 6,044,205 A | 3/2000 | Reed et al. | 395/200.31 |
| 6,049,547 A | 4/2000 | Fisher et al. | 370/412 |
| 6,064,730 A | 5/2000 | Ginsberg | 379/265 |
| 6,064,731 A | 5/2000 | Flockhart et al. | 379/265 |
| 6,088,441 A | 7/2000 | Flockhart et al. | 379/265 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |
| 6,295,353 B1 | 9/2001 | Flockhart et al. | 379/265 |
| 6,366,668 B1 | 4/2002 | Borst et al. | 379/266.04 |
| 6,389,028 B1 * | 5/2002 | Bondarenko et al. | 370/401 |
| 6,430,282 B1 * | 8/2002 | Bannister et al. | 379/211.02 |
| 6,449,356 B1 * | 9/2002 | Dezonno | 379/265.01 |
| 6,449,646 B1 * | 9/2002 | Sikora et al. | 709/226 |
| 6,453,038 B1 | 9/2002 | McFarlane et al. | 379/265.05 |
| 6,463,148 B1 * | 10/2002 | Brady | 379/265.01 |
| 6,463,346 B1 | 10/2002 | Flockhart et al. | 700/102 |
| 6,535,600 B1 | 3/2003 | Fisher et al. | 379/265.12 |
| 6,597,685 B2 | 7/2003 | Miloslavsky et al. | 370/352 |
| 6,704,409 B1 * | 3/2004 | Dilip et al. | 379/265.02 |
| 2002/0118816 A1 | 8/2002 | Flockhart et al. | 379/265.12 |
| 2002/0181692 A1 | 12/2002 | Flockhart et al. | 379/265.02 |

* cited by examiner

WAIT TIME PREDICTION ARRANGEMENT FOR NON-REAL-TIME CUSTOMER CONTACTS

CROSS REFERENCE TO RELATED APPLICATION

The present application claims the benefits of U.S. Provisional application Serial No. 60/200,520, filed Apr. 27, 2000, and entitled "WAIT TIME PREDICTION ARRANGEMENT FOR NON-REAL-TIME CUSTOMER CONTACTS", which is hereby incorporated by reference in its entirety.

FIELD OF THE INVENTION

The present invention relates generally to techniques for estimating customer wait times in customer contact systems and specifically to techniques for estimating wait times for non-real-time customer contacts.

BACKGROUND OF THE INVENTION

In customer contact systems or use centers, calls incoming to a call center are answered and handled by a plurality of agents. The system automatically distributes and connects incoming calls to whatever agents are suited to handling the calls and are free, i.e., not handling other calls at the moment. As used herein, a "call" refers to any mode or type of contact between two entities, including without limitation voice calls, VoIP, text-chat, e-mail, fax, electronic documents, webforms, voice messages, and video calls, to name but a few.

A system frequently becomes overloaded when no suitable agents are available to handle calls when the calls come in. The calls are placed in different queues based upon some preestablished criteria and are placed in each queue in the order of their arrival and/or priority.

Information on how long either an individual or an average caller has to wait to have his or her call serviced is important information for the service provider. It is often the most important factor for deciding how to treat the call and thus serves as a crucial tool for customizing customer service. Estimated waiting time is also an important measure of the service provider's performance.

Numerous techniques have been developed over time to estimate a call's wait-time in queue. One estimation technique uses the average wait time to answer calls that have been placed in queue. Another estimation technique uses the wait time of the oldest call in the queue. Yet another estimation technique uses, as the wait-time estimate, the number of calls in the queue multiplied by the average time it takes an agent to handle a call, divided by the number of agents available to handle the calls. Yet another estimation technique is known as weighted advanced time (WAT), which is an exponential moving average based on the Average Advanced Time (AAT) of each individual call in queue. This approach is described in U.S. Pat. No. 5,506,898, which is incorporated herein by this reference.

These predictive techniques have been optimized for real-time contacts but can be inaccurate when applied to non-real-time contacts. As used herein, real-time contacts refer to contacts in which the contacting entity or customer is present during the waiting (or queuing) period and can choose to abandon or disconnect the contact if the call is not serviced within an acceptable period. Common examples include voice calls, VoIP, text-chat, video calls, and the like. Non-real-time contacts refer to contacts in which the contacting entity or customer is unable to abandon or disconnect the contact. Common examples include e-mail, fax, electronic or paper documents, webform submissions, voice messages, and the like. For example, non-real-time contacts may stay in queue overnight or over a weekend or holiday when the contact center is unstaffed. When the contact is serviced, the time to advance one position in the queue for the contact may be exceptionally large. The above-predictive techniques may be skewed by such excessive advance times and cause work distribution to be handled inefficiently and/or ineffectively.

Although some architectures have features to consider for certain types of events that can skew the wait-time prediction, the functionalities are inapplicable or undesirable for non-real-time contacts. For example, one architecture marks or flags all calls in a queue when a clock adjustment occurs. The wait or advance times for all of the marked or flagged items are discarded in determining the predicted wait time. This approach discards unnecessarily wait-time information that should be considered in determining the predicted wait time for non-real-time contacts.

SUMMARY OF THE INVENTION

These and other problems are addressed by the present invention. The present invention is directed generally to an architecture for predicting queue wait times that removes undesirable deviations in wait time predictions caused by predetermined events and/or to an architecture for predicting queue wait times for non-real-time contacts or calls in a different manner from real-time contacts or calls serviced by the same or a different system.

In one embodiment, a method is provided for estimating a waiting time of a particular item in a queue that includes the steps of:

(a) providing a first item in a queue for servicing, e.g., by a working agent, at a first time, wherein at least one of the following statements is true:

(I) the first time follows the occurrence of at least one of the following events: (i) the queue has no working agents (e.g., the switching center (or call or contact center) is unstaffed); (ii) the queue is empty (e.g., the contact center has idle working agents), (iii) the contact center (or call or switching center) is not operational (e.g., the contact center is shut down or is otherwise out of service); (iv) a working agent of the contact center elects not to service the item (e.g., the rules governing the servicing of items permits the next available working agent to defer or decline servicing the item); and/or (v) a change of the clock (such as by an administrator or otherwise) that is accessed by the contact center for timing information; and (II) a time associated with the first item exceeds a predetermined time; and (b) excluding a time interval, advance time, or other type of timing information associated with the first item from an estimation of a wait time (e.g., WAT, etc.) associated with the queue. The wait time can be determined using any suitable techniques, including those described above.

The first item (or work item) can be a real or non-real-time contact, with non-real-time contacts being most typical.

This methodology can have numerous advantages. First, the methodology provides an effective technique for providing accurate wait-time predictions for non-real-time contacts. For example, when a contact center is unstaffed overnight or over a weekend or holiday the first contact serviced will not cause the WAT value to be adjusted upward by an inappropriate amount. Second by discarding only the item that immediately follows or is impacted by the predetermined type of event, the methodology avoids unnecessarily discarding important wait-time information. Third by discarding items having advance times that exceed a predetermined time interval, the methodology discards items that would adversely impact the wait-time prediction but are not in the list of predetermined types of events.

In one configuration, the statements are not true with respect to a second item in the queue. In that event, a time interval, advance time, or other type of timing information associated with the second item is used in determining the wait time prediction.

In another configuration, the method determines an advance time for the second item by measuring the time interval between successive queue services from the queue; that is, a service time associated with a preceding item in the queue (which may be the first item) is subtracted from the second time. Unlike prior art architectures, the advance time is determined independently of an ordering of the second item in the queue.

In another configuration, the method includes the additional step of setting a marker, pointer or other type of indicator (or deactivating a marker, pointer or other type of indicator) when the statement is found to exist (or one of the events (i) through (v) occurs) with respect to an item in a queue and/or the queue itself.

In another embodiment, a method for estimating a waiting time is provided that includes the steps of:

(a) providing a first item in a queue for servicing at a first time, the first time following the occurrence of a predetermined type of event;

(b) excluding a time interval, advance time, or other type of timing information associated with the first item from an estimation of a wait time associated with the queue;

(c) providing a second item in the queue for servicing at a second time, wherein both of the first and second items were in the queue when the predetermined type of event occurred; and (d) using a time interval, advance time, or other type of timing information associated with the second item in the estimation of a wait time associated with the queue. This method is particularly useful for considering waiting time aberrations that occur when the system clock is changed; the contact center is nonoperational; and/or a working agent of the contact center elects not to service the item.

In yet a further embodiment, a method for estimating a waiting time is provided that includes the steps of:

(a) providing a queue of items;

(b) filtering an item in the queue based upon at least one predetermined criterion (e.g., the events or conditions referred to above) to form a filtered set of items, wherein at least one of the items in the queue is excluded from the filtered set of items;

(c) determining an advance time for a selected item in the filtered set of items by subtracting from a service time associated with the selected item a service time associated with a preceding item; and (d) determining an estimated waiting time in the queue for a particular item based on the advance time. Step (c) typically includes the substep of determining a weighted advance time (WAT) based on the advance times for the items in the particular queue, and step (d) would determine the estimated waiting time in the queue for the particular item based on the WAT.

In other embodiments, the present invention includes system architectures to perform the above-described method steps.

In yet a further embodiment, an arrangement for estimating a waiting time of a particular item in a queue of items is provided that includes:

(a) at least one queue of items, wherein first and second items are contained in a first queue;

(b) a memory containing the at least one queue of items;

(c) a processor in communication with the memory for advancing enqueued items in the at least one queue of items;

(d) a filter for filtering serviced items in the first queue to form a set of filtered items, the filtering being based on whether the item was enqueued in the first queue after at least one of the following types of events occurred: (i) the first queue had no working agents; (ii) the first queue was empty, (iii) a contact center associated with the first queue was not operational; (iv) a working agent of the contact center elected not to service the item; and/or (v) a change of the time setting of the clock providing timing information to the contact center; and (e) a waiting time predictor for predicting, based on a time associated with an item in the set of filtered items, a waiting time of a particular item in the first queue.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
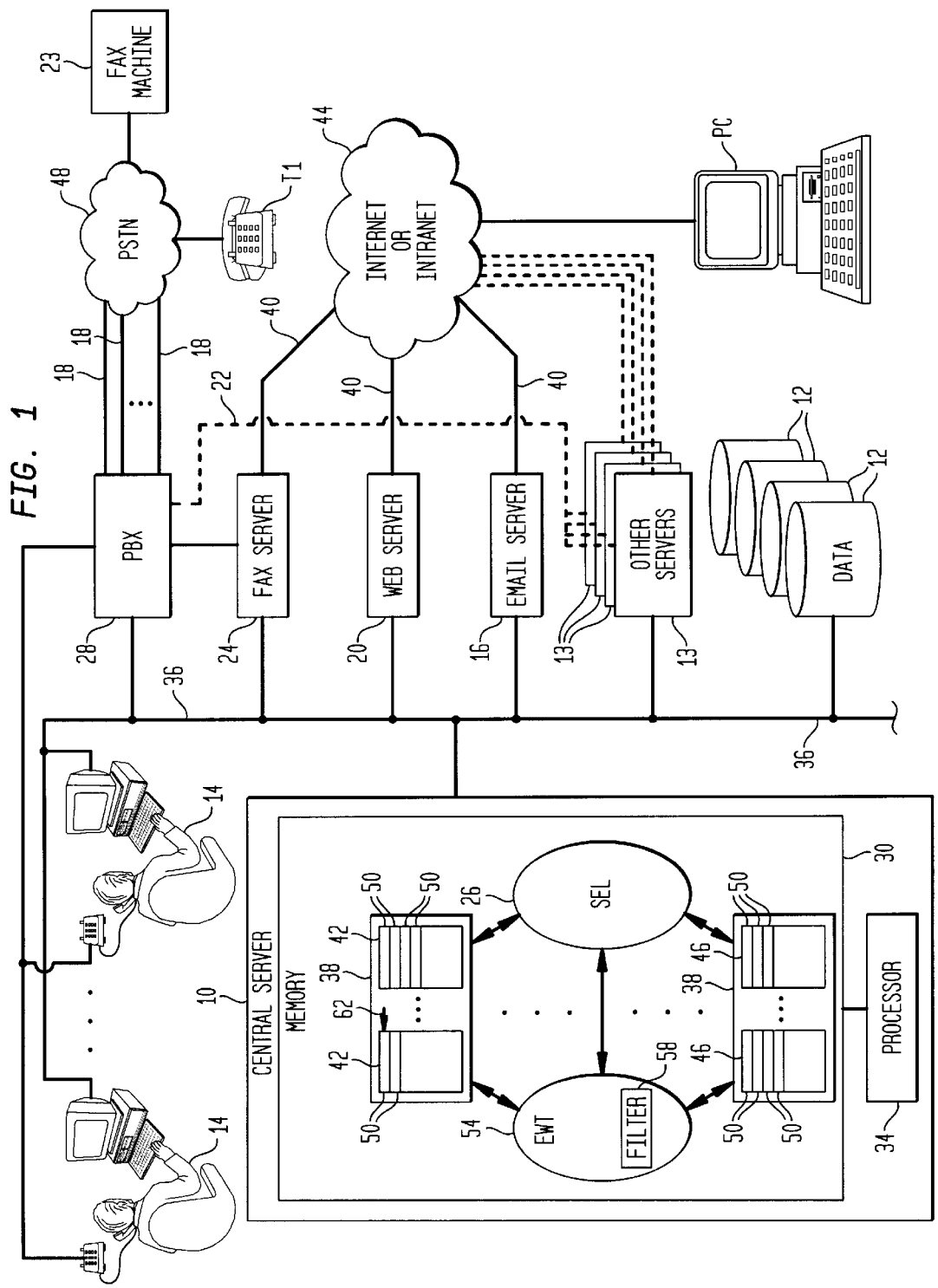
FIG. 1 is a block diagram of a contact center that includes an illustrative embodiment of the invention.

FIG. 1 shows an illustrative embodiment of the present invention. A contact center comprises a central server 10 (such as a modified version of the CRM Central 2000 Server™ of Lucent Technologies, Inc.), a set of data stores or databases 12 containing contact or customer related information and other information that can enhance the value and efficiency of the contact, and a plurality of servers, namely a fax server 24, a web server 20, an email server 16, and other servers 13, a private branch exchange PBX 28 (or private automatic exchange PAX), a plurality of working agents 14 operating computer work stations, such as personal computers, and/or telephones or other type of voice communications equipment, all interconnected by a local area network LAN (or wide area network WAN) 36. The fax server 24, web server 20 and email server 16 are connected via communication connections 40 to an internet and/or intranet 44. The other servers 13 can be connected via optional communication lines 22, 32 to the PBX 28 and/or internet or intranet 44. As will appreciated, other servers 13 could include a scanner (which is normally not connected to the PBX 28 or internet or intranet 44), interactive voice recognition IVR software, VoIP software, video call software, voice messaging software, an IP voice server, and the like. The PBX 28 is connected via a plurality of trunks 18 to the public switch telecommunication network PSTN 48 and to the fax server 24 and telephones of the agents 14. As will be appreciated, faxes can be received via the PSTN 48 or via the internet or intranet 44 by means of a suitably equipped personal computer. The PBX 28, fax server 24, email server 16, web server 20, and database 12 are conventional.

In the architecture of FIG. 1 when the central server 10 forwards a voice contact to an agent, the central server 10 also forwards information from databases 12 to the agent's computer work station for viewing (such as by a pop-up display) to permit the agent to better serve the customer.

As will be appreciated, the central server 10 is notified via LAN 36 of an incoming real-time or non-real-time contact by the telecommunications component (e.g., PBX 28, fax server 24, email server 16, web server 20, and/or other server 13) receiving the incoming contact. The incoming contact is held by the receiving telecommunications component until the central server 10 forwards instructions to the component to forward the contact to a specific station or agent 14. The server 10 distributes and connects these contacts to stations 14 of available agents based on set of predetermined criteria. The agents 14 process the contacts sent to them by the central server 10.

The memory 30 includes a plurality of sets 38 of call queues 42 and 46. Each set 38 of call queues 42 and 46 conventionally serves and holds contacts for a different work type and/or for real-versus non-real-time contacts. In the depicted embodiment, queues 42 serve non-real-time contacts while queues 46 serve real-time contacts. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness. Within each set 38 of queues 42 and 46, each queue holds contacts of a different priority and/or different type (e.g., e-mail, fax, electronic or paper documents, webform submissions, voice messages, voice calls, VoIP calls, text chat, video calls, and the like). The priority of a contact is determined according to well known predefined criteria. Each queue 42 and 46 normally functions as a first-in, first-out (FIFO) buffer memory, and includes a plurality of entries, or positions 50, each for identifying a corresponding one enqueued contact. The position 50 at the head of the queue is considered to be position 1, the next subsequent position 50 to be position number 2, and so forth.

Memory 30 further includes an estimated wait time (EWT) function, (or waiting time predictor) 54. As its name implies, this function determines an estimate of how long a contact that is placed in a queue 42 or 46 will have to wait before being delivered to an agent 14 for servicing. The estimate is derived separately by EWT function 54 for each queue 42 or 46 of each set 38.

For real-time contacts, the estimate is based on the average rate of advance of calls through positions 50 of the contacts' corresponding queue 46. An illustrative implementation of EWT function 54 for real-time contacts is disclosed by U.S. Pat. No. 5,506,898.

For non-real-time contacts, the estimate is determined differently than for real-time contacts. The system records the time at which each item is serviced from its respective queue. The advance time is then calculated by measuring the time interval between the time of servicing of a first item in the first position 50 at the head of the queue and the time of servicing of a second, later item in the second position. Stated another way, the advance time is determined by the following equation:

Advance Time=(the time of servicing of the second item)−(the time of servicing of the first item).

The weighted average advance time WAT can then be determined using the advance time, the Estimated Wait Time EWT using the WAT.

To guard against substantial fluctuations in the advance time from certain types of events, a filter 58 is provided. The processor 34 sets an indicator 62 when a predetermined type of event occurs and the filter 58 discards the advance time associated with the marked item. Predetermined types of events are as follows:

(a) The respective queue has no working agents available for servicing items from the queue. This event occurs, for example, after normal working hours when the contact center is unstaffed. Non-real-time contacts will remain in the queue during the unstaffed period.

(b) The respective queue is empty. This event occurs, for example, during quiet periods in which there are no items in the queue.

(c) The system clock is changed. This event occurs, for example, when the system clock is changed to or from daylight savings time. Non-real-time contacts may remain in the queue during the clock change.

(d) The system is nonoperational. This event occurs, for example, when the system is down for a time and then rebooted. Non-real-time contacts may persist in the queue during the period the system is shut down.

(e) The agent defers the servicing of an enqueued item.

Memory 30 can further include a contact-selection (SEL) function 26. Function 26 is conventional in that, for each contact at the head of a queue, it determines, for real-time a current or oldest wait time or CWT, the weighted average advance time WAT, the expected wait time EWT, and/or the predicted wait time PWT (which is the sum of the CWT and WAT), and, for each available agent, it selects a contact from queues 42 and/or 46 for connection to and handling by that agent. This feature is further described in U.S. Pat. No. 5,905,793, which is incorporated herein by this reference.

Figure 2:
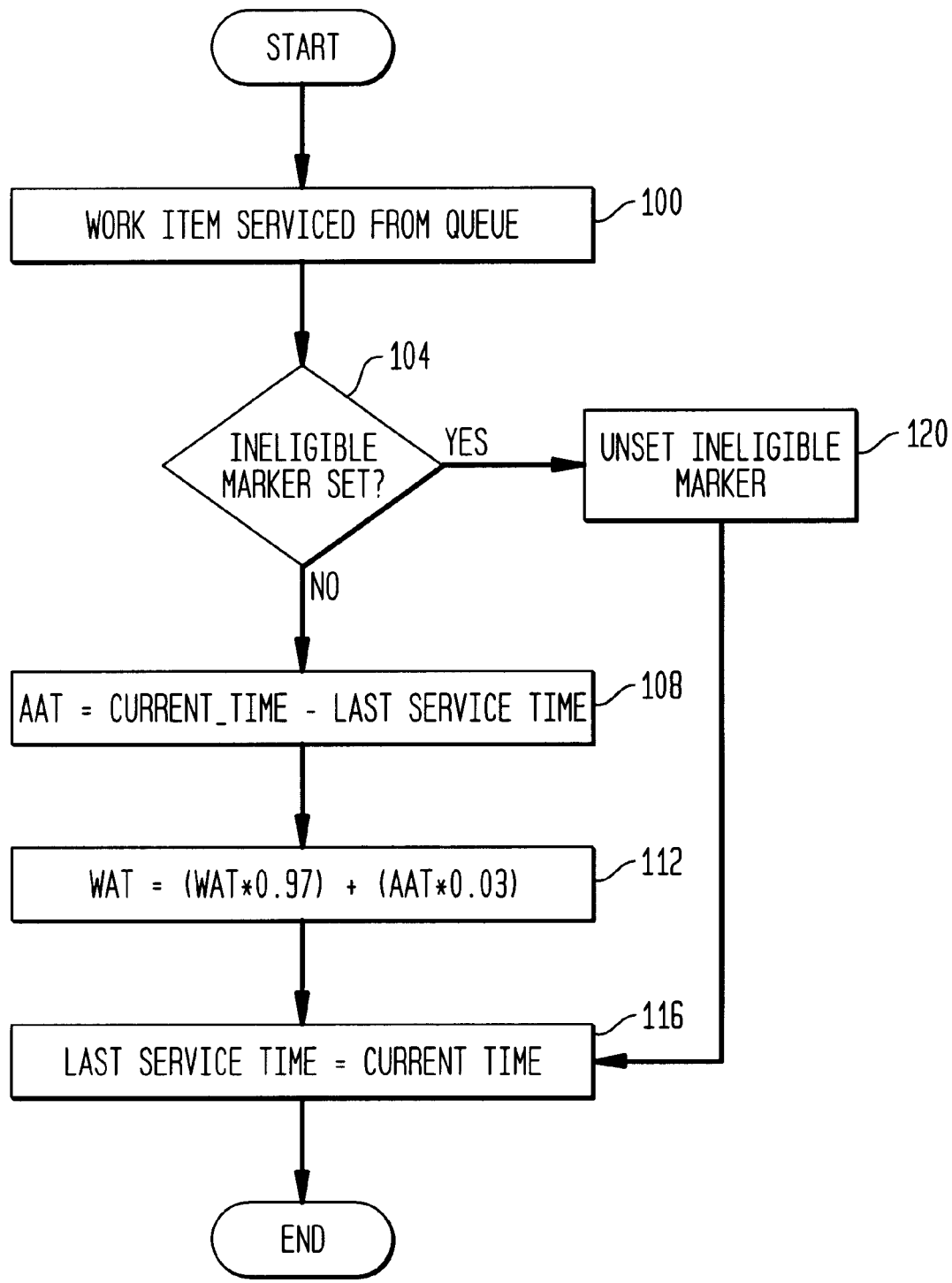
FIG. 2 is a flow diagram of the process used to determined average advanced time.
Figure 3:
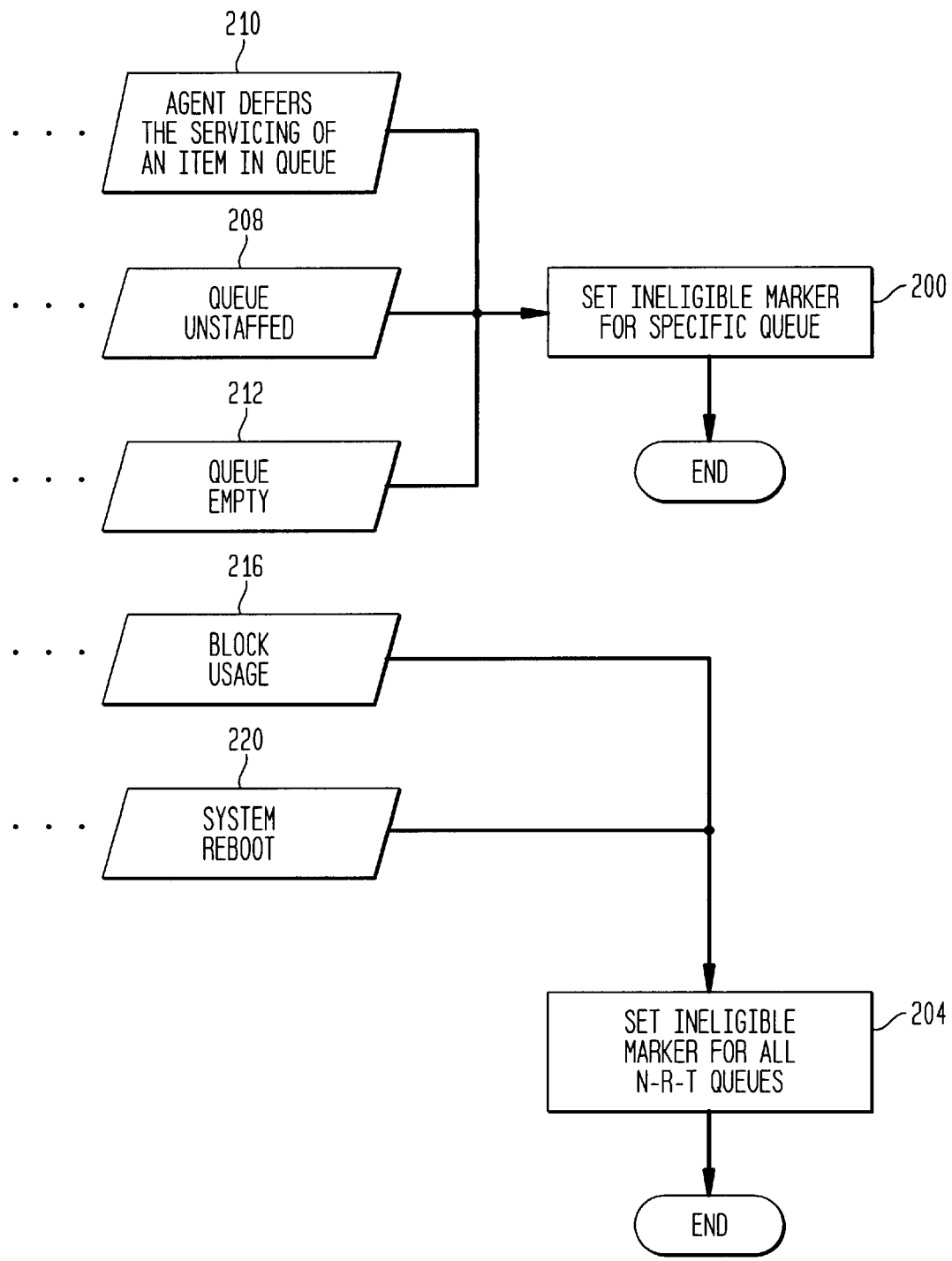
FIG. 3 is a flow diagram of the process used to mark items in the queue that are not to be considered in determining predicted wait times.

The operation of the EWT function 54 will now be described with reference to FIGS. 2 and 3. Referring to FIG. 2, the processor in box 100 directs an item from a queue to be serviced by a working agent. The processor records the time at which the item was forwarded from the queue to the working agent. The processor then adjusts the WAT and/or PWT, if appropriate. In decision diamond 104, the processor determines if the ineligible indicator 62 is set with respect to the item serviced from the queue. "Ineligible" means that the next advance time calculation will not be used to adjust a waiting time prediction (e.g., WAT, etc.) If not, the processor determines in box 108, the advance time as set forth above, in box 112 determines the $WAt_{new}$ using the equation, $WAt_{new}=(WAT_{old}*0.97)+(\text{advance time}*0.03)$, where $WAT_{old}$ is the WAT before the item was serviced from the queue, and sets in box 116 the last service time (the service time of the item serviced before the last item was serviced) equal to the current service time (the service time of the last item serviced). If the ineligible marker 62 is set with respect to the item, the processor in box 120 unsets the ineligible marker and bypasses boxes 108 and 112 and proceeds to box 116.

The operation of the marker or indicator 62 will now be described with reference to FIG. 3. When one of the above events occurs, the processor in boxes 200 and 204 sets the marker on the item in position I in the pertinent queues 42 and/or 46. When an agent defers the servicing of an item in queue (box 210), the queue is unstaffed (box 208) or empty (box 212), the processor in box 200 sets the ineligible marker 62 only for the queue directly impacted by the either of these three events. In some architectures, this step is performed not only for non-real-time queues but also for real-time queues. When the system clock is changed (box 216) or the system is rebooted (box 220), the processor in box 204 sets the marker 62 for all non-real-time queues and, in some architectures, for all real-time queues as well. Although FIG. 1 depicts setting the marker on the item in position 1, the marker could also be set on the queue itself.

A number of variations and modifications of the invention can be used. It would be possible to provide for some features of the invention without providing others. For example in one alternative embodiment, each queue set 38 includes only one queue of items in which contacts having a different priority are enqueued in their order of priority.

In another alternative embodiment, the processor can include any conventional wait-time prediction techniques, such as those described in the Background, in lieu of the techniques set forth above.

In yet another alternative embodiment, the working agent has discretion in determining whether or not to handle a real-time and/or non-real-time contact. In this embodiment, the processor 34 flags or marks any item in a queue with respect to which an available agent exercises this discretion and decides not to service the item.

In a further alternative embodiment, the filter can be modified to discard timing information for an item which is unnaturally long. For example, the filter can discard a time interval associated with a serviced item if the time interval exceeds a predetermined time interval duration. Alternatively, this inquiry could be used as a catch-all (after the processor checks for the predetermined events noted above, to catch any spurious time intervals which are not attributable to the predetermined events.

In yet another embodiment, the indicator or marker is set when an item in the queue is to be considered and deactivated or unset when the item in the queue is to be discarded by the filter 58. Accordingly, in this embodiment the indicator is normally set.

In yet a further embodiment, the formula for average advance time set forth in U.S. Pat. No. 5,506,898 would be used by default, but the new formula set forth above would be used for any contact that has spanned an unstaffed period. In this embodiment, all items in the queue would be marked when the queue is unstaffed. On servicing an unmarked item in the queue, the original formula of "time in queue/original queue position" would be used to calculate the average advance time and then adjust the WAT. On servicing a sequence of marked items, the first marked item serviced would be ignored, and subsequent marked items serviced would use the new formula "current service time–previous service time" to calculate the advance time and then adjust the WAT.

In yet another alternative embodiment, the queues are not serviced in a strict FIFO order. The new formula could be used to calculate the average advance time accurately. Because work items are not serviced in FIFO order, it is no longer possible to accurately predict the wait time of any individual item in queue; however, the contact center can judge how long it will take to service all items currently in queue, and evaluate whether current staffing levels are adequate to meet service time objectives.

In yet another alternative embodiment, the central server of FIG. 1 is replaced with the subscriber-premises equipment disclosed in U.S. Pat. Nos. 5,905,793; 5,506,898; and 5,206,903, all of which are incorporated herein by this reference. In the contact center of FIG. 1, automatic call distribution ACD logic, including the queues, EWT module, and work distributor are separated from the ACD switch and located in an external server.

In yet another embodiment, real- and/or non-real-time contacts enter the contact center via computational components other than those shown in FIG. 1. For example, such components can be other types of servers such as an IP voice server or other types of communications equipment such as an IP switch, a voice messaging system, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for estimating a waiting time of at least one item in a queue, comprising:

providing a first item in the queue for servicing at a first time, wherein at least one of the following conditions exists with respect to the first item:
(a) the first time follows the occurrence of a predetermined type of event, the predetermined type of event being at least one of (i) the queue containing the first item has no working agents; (ii) the queue containing the first item was empty immediately before the first item was placed in the queue, (iii) a contact center associated with the queue containing the first item is not operational; and (iv) a working agent of the contact center elects not to service the first item; and
(b) a time associated with the first item exceeds a predetermined time; and excluding a time interval associated with the first item from an estimation of a wait time associated with the queue.

2. The method of claim 1, wherein the first item is a non-real-time contact.

3. The method of claim 1, further comprising:

providing a second item in the queue for servicing at a second later time;

determining that neither of the conditions (a) and (b) exist with respect to the second item; and computing a time interval for the second item by subtracting from the second time a service time associated with a third item preceding the second item in the queue, wherein the service time associated with the third item is the time at which the third item was serviced.

4. The method of claim 3, wherein the time interval for the second item is determined independent of an ordering of the second item in the queue.

5. The method of claim 1, wherein the at least one of the following conditions includes only the conditions identified in (a) above.

6. The method of claim 1, further comprising:

setting an indicator when the at least one of the following conditions is found to exist with respect to an item in a queue.

7. The method of claim 3, wherein the first item is the preceding item and further comprising:

in response to the first item being dequeued at the first time, noting the first time; and in response to the second item being dequeued at the second time, noting the second time.

8. A method for estimating a waiting time of at least one item in a queue, comprising:

providing a first item in the queue for servicing at a first time, the first time following the occurrence of a predetermined type of event;

excluding timing information associated with the first item from an estimation of a wait time associated with the queue, the timing information being related to the duration of the placement of the first item in the queue;

providing a second item in the queue for servicing at a second time, wherein both of the first and second items were in the queue when the predetermined type of event occurred; and using timing information associated with the second item in the estimation of a wait time associated with the queue.

9. The method of claim 8, wherein the first and second items are non-real-time contacts.

10. The method of claim 8, wherein the using step includes:

computing timing information for the second item by subtracting from the second time a service time associated with a third item preceding the second item in the queue, wherein the service time associated with the third item is the time at which the third item was serviced and the timing information for the second item is related to duration of the placement of second item in the queue.

11. The method of claim 10, wherein the predetermined type of event is at least one of (a) a change to a system clock; (b) a contact center associated with the queue containing the first item is nonoperational; and (c) a working agent of the contact center elects not to service the first item.

12. The method of claim 8, further comprising:

setting an indicator when the predetermined type of event occurs.

13. A method for estimating a waiting time of at least one item in a queue, comprising:

providing a queue of items;

filtering an item in the queue based upon at least one predetermined criterion to form a filtered set of items, wherein at least a first item in the queue is excluded from the filtered set of items; and determining an advance time for a selected item in the filtered set of items by subtracting from a service time associated with the selected item a service time associated with a second item preceding the selected item in the queue; and determining an estimated waiting time in the queue for a third item based on the advance time.

14. The method of claim 13, wherein the all of the items in the queue are non-real-time contacts.

15. The method of claim 13, wherein the advance time is determined independent of an ordering of the second item in the queue.

16. The method of claim 13, wherein the predetermined criterion is at least one of the following:

(a) a service time of an item follows the occurrence of a predetermined type of event, the predetermined type of event being at least one of: (i) the queue has no working agents; (ii) the queue was empty immediately before the at least one item was placed in the queue, (iii) a contact center associated with the queue is not operational; (iv) a working agent of the contact center elects not to service the at least one item; and (v) a system clock of the contact center is changed; and (b) a time associated with the item exceeds a predetermined time.

17. The method of claim 13, further comprising:

setting an indicator when the predetermined criterion is found to exist.

18. A method for handling contacts in a contact center, comprising:

determining at least one of a first advance and wait time associated with a first enqueued item in at least one queue using, respectively at least one of a first advance time and first wait time computational algorithm; and determining at least one of a second advance and wait time associated with a second enqueued item in the at least one queue using, respectively at least one of a second advance time and second wait time computational algorithm;

wherein the at least one of a first advance time and first wait time computational algorithm differs from the at least one of a second advance time and second wait time computational algorithm and wherein the first enqueued item differs from the second enqueued item.

19. The method of claim 18, wherein the at least one queue comprises first and second queues, wherein the at least a first advance time and a first wait time is associated with the first queue and the at least a second advance time and second wait time is associated with the second queue, and wherein the at least one of a first advance time and first wait time computational algorithm includes ordering information associated with the first queue and the at least one of a second advance time and second wait time computational algorithm excludes ordering information associated with the second queue.

20. The method of claim 18, wherein the at least one queue comprises first and second queues, wherein the at least one of a first advance time and wait time is associated with the first queue and the at least one of a second advance time and wait time is associated with the second queue, and wherein the at least one of a first advance time and wait time is an advance time and the at least one of a second advance time and wait time is an advance time, and further comprising:

excluding from a wait-time prediction associated with at least one of the first and second queues timing information of an item in the at least one of the first and second queues, wherein the item follows a predetermined type of event.

21. The method of claim 18, wherein the at least one queue comprises first and second queues, wherein the at least one of a first advance time and first wait time is associated with the first queue and the at least one of a second advance time and second wait time is associated with the second queue, and wherein the first enqueued item is a non-real-time contact and the second enqueued item is a real-time contacts.

22. The method of claim 18, wherein the at least one of a first advance time and first wait time and the at least one of a second advance time and second wait time are associated with differing queues.

23. The method of claim 18, wherein the at least one queue comprises first and second queues, wherein the at least one of a first advance time and wait time is associated with the first queue and the at least one of a second advance time and wait time is associated with the second queue, wherein the at least one of a first advance time and wait time is the first advance time and the at least one of a first advance time and first wait time computational algorithm is the first advance time computational algorithm, wherein the at least one of a second advance time and wait time is the second advance time and the at least one of a second advance time and second wait time computational algorithm is the second advance time computational algorithm, wherein the second advance time computational algorithm determines advance time for the second enqueued item by the following equation:

$$\frac{\text{(time the second item is serviced} -}{\text{time the second item was originally queued)}}{\text{(original queue position of second item)}}$$

and wherein the second advance time computational algorithm determines advance time for the first enqueued item by the following equation:

time the first item is serviced−time a preceding enqueued item is serviced, the preceding enqueued item preceding the first item in the first queue.

24. The method of claim 20, wherein the predetermined type of event is at least one of (i) the queue containing the first item has no working agents; (ii) the queue containing the first item was empty immediately before the first item was placed in the queue, (iii) a contact center associated with the queue containing the first item is not operational; and (iv) a working agent of the contact center elects not to service the first item.

25. The method of claim 18, wherein the at least one queue comprises first and second queues, wherein the at least one of a first advance time and wait time is associated with the first queue and the at least one of a second advance time and wait time is associated with the second queue, wherein the at least one of a first advance time and wait time is the first wait time and the at least one of a first advance time and first wait time computational algorithm is the first wait time computational algorithm, wherein the at least one of a second advance time and wait time is the second wait time and the at least one of a second advance time and second wait time computational algorithm is the second wait time computational algorithm, wherein the first wait time algorithm determines the first wait time by the following equation:

(Current queue position of first item)(new average wait time), wherein new average wait time is as follows:

(old average wait time*0.97)+((time the first item is serviced−time a preceding enqueued item is serviced) *0.03), with the old average wait time being the average wait time before application of the algorithm, and wherein the second wait time algorithm determines the second wait time by the following equation:

(Current queue position of first item)(new average wait time), wherein new average wait time is as follows:

(old average wait time*0.97)+(average advance time*0.03), wherein the average advance time is:

$$\frac{\text{(time the second item is serviced} -}{\text{time the second item was originally queued)}}{\text{(original queue position of second item)}}.$$

26. An arrangement for estimating a waiting time of a particular item in a queue of items, comprising:

directing means for directing a first item in a queue for servicing by a working agent at a first time, wherein at least one of the following conditions exists with respect to the first item:

(a) the first time follows the occurrence of a predetermined type of event, the predetermined type of event being at least one of (i) the queue containing the first item has no working agents; (ii) the queue containing the first item was empty immediately before the first item was placed in the queue, (iii) a contact center associated with the queue containing the first item is not operational; and (iv) a working agent of the contact center elects not to service the first item; and (b) a time associated with the first item exceeds a predetermined time; and filtering means for excluding timing information associated with the first item from an estimation of a wait time associated with the queue containing the first item, wherein the timing information being related to a duration of the placement of the first item in the queue.

27. The arrangement of claim 26, wherein the first item is a non-real-time contact.

28. The arrangement of claim 26, further comprising:

directing means for directing a second item in the queue for servicing at a second time, wherein the filtering means determines that neither of the conditions (a) and (b) exist with respect to the second item; and computing means for computing timing information for the second item by subtracting from the second time a service time associated with a third item preceding the second item in the queue, wherein the service time associated with the third item is the time at which the third item was serviced.

29. The arrangement of claim 26, wherein the timing information is determined independent of an ordering of the second item in the queue.

30. The arrangement of claim 26, further comprising:
setting means for setting an indicator when the at least one of the following conditions is found to exist with respect to an item in a queue.

31. An arrangement for estimating a waiting time of a second item in a queue of items, comprising:
directing means for directing a first item in a queue for servicing at a first time, wherein the queue contains first and second items;
filtering means for excluding a first time interval associated with the first item from an estimation of a wait time associated with the queue and including a second time interval associated with the second item in the estimation of the wait time associated with the queue;
determining means for determining the second time interval associated with the second item by subtracting from the first time a service time associated with a third item preceding the second item in the queue; and
wait time estimation means for estimating a waiting time in the queue for a particular item using the second time interval.

32. The arrangement of claim 31, wherein each of the items in the queue is a non-real-time contact.

33. The arrangement of claim 31, wherein the filtering means filters based on one or more predetermined criteria that is at least one of the following:
(a) a service time of an item follows the occurrence of a predetermined type of event, the predetermined type of event being at least one of: (i) the queue has no working agents; (ii) the queue is empty, (iii) a contact center associated with the queue is not operational; (iv) a working agent of the contact center elects not to service the item; and (v) a system clock of the contact center is changed; and
(b) a time associated with the item exceeds a predetermined time.

34. An arrangement for estimating a waiting time of a second item in a queue of items, comprising:
at least one queue of items, wherein first and second items are contained in a first queue;
a memory containing the at least one queue of items;
a processor in communication with the memory for advancing enqueued items in the at least one queue of items;
a filter for filtering items to be serviced in the first queue to form a set of filtered items, the filtering being based on whether a selected item was enqueued in the first queue after at least one of the following types of events occurred: (i) the first queue had no working agents; (ii) the first queue was empty immediately before the selected item was placed in the first queue, (iii) a contact center associated with the first queue was not operational; and (iv) a working agent of the contact center elected not to service the selected item; and
a waiting time predictor for predicting, based on a time associated with a first filtered item in the set of filtered items, a waiting time of a second filtered item in the first queue.

35. The arrangement of claim 34, wherein the first and second items are non-real-time contacts.

36. The arrangement of claim 34, wherein the waiting time predictor computes an advance time by subtracting from a service time associated with the second item a service time associated with the first item.

37. The arrangement of claim 34, wherein the at least one of the following types of events includes only conditions (i), (ii), and (iii).

38. The arrangement of claim 34, further comprising:
an indicator of when the at least one of the following types of events is found to exist.

39. A contact center, comprising:
at least one queue to hold items for servicing by at least one resource;
a first function operable to determine at least one of a first advance and wait time associated with a first enqueued item in the at least one queue using, respectively, at least one of a first advance time and first wait time computational algorithm; and
a second function operable to determine at least one of a second advance and wait time associated with a second enqueued item in the at least one queue using, respectively, at least one of a second advance time and second wait time computational algorithm;
wherein the at least one of a first advance time and first wait time computational algorithm differs from the at least one of a second advance time and second wait time computational algorithm and wherein the first enqueued item differs from the second enqueued item.

40. The contact center of claim 39, wherein the at least one queue comprises first and second queues, wherein the at least one of a first advance time and first wait time is associated with the first queue and the at least one of a second advance time and second wait time is associated with the second queue, and wherein the first enqueued item is a non-real-time contact and the second enqueued item is a real-time contacts.

41. The contact center of claim 39, wherein the at least one of a first advance time and first wait time and the at least one of a second advance time and second wait time are associated with differing queues.

42. The contact center of claim 39, wherein the at least one queue comprises first and second queues, wherein the at least one of a first advance time and wait time is associated with the first queue and the at least one of a second advance time and wait time is associated with the second queue, wherein the at least one of a first advance time and wait time is the first advance time and the at least one of a first advance time and first wait time computational algorithm is the first advance time computational algorithm, wherein the at least one of a second advance time and wait time is the second advance time and the at least one of a second advance time and second wait time computational algorithm is the second advance time computational algorithm, wherein the second advance time computational algorithm determines advance time for the second enqueued item by the following equation:

$$\frac{\text{(time the second item is serviced} - \text{time the second item was originally queued)}}{\text{(original queue position of second item)}}$$

and wherein the second advance time computational algorithm determines advance time for the first enqueued item by the following equation:

time the first item is serviced−time a preceding enqueued item is serviced, the preceding enqueued item preceding the first item in the first queue.

43. The contact center of claim 39, The contact center of claim 18, wherein the at least one queue comprises first and second queues, wherein the at least one of a first advance time and wait time is associated with the first queue and the at least one of a second advance time and wait time is associated with the second queue, wherein the at least one of a first advance time and wait time is the first advance time and the at least one of a first advance time and first wait time computational algorithm is the first advance time computational algorithm, and wherein the at least one of a second advance time and wait time is the second advance time and the at least one of a second advance time and second wait time computational algorithm is the second advance time computational algorithm.

44. The contact center of claim 39, wherein the at least one queue comprises first and second queues, wherein the at least one of a first advance time and wait time is associated with the first queue and the at least one of a second advance time and wait time is associated with the second queue, wherein the at least one of a first advance time and wait time is the first wait time and the at least one of a first advance time and first wait time computational algorithm is the first wait time computational algorithm, wherein the at least one of a second advance time and wait time is the second wait time and the at least one of a second advance time and second wait time computational algorithm is the second wait time computational algorithm, wherein the first wait time algorithm determines the first wait time by the following equation:

(Current queue position of first item)(new average wait time), wherein new average wait time is as follows:

(old average wait time*0.97)+((time the first item is serviced−time a preceding enqueued item is serviced)

*0.03), with the old average wait time being the average wait time before application of the algorithm, and wherein the second wait time algorithm determines the second wait time by the following equation:

(Current queue position of first item)(new average wait time), wherein new average wait time is as follows:

(old average wait time*0.97)+(average advance time*0.03), wherein the average advance time is:

$$\frac{(\text{time the second item is serviced} - \text{time the second item was originally queued})}{(\text{original queue position of second item})}.$$

45. The contact center of claim 39, wherein the at least one queue comprises first and second queues, wherein the at least one of a first advance time and wait time is associated with the first queue and the at least one of a second advance time and wait time is associated with the second queue, wherein the at least one of a first advance time and wait time is the first wait time and the at least one of a first advance time and first wait time computational algorithm is the first wait time computational algorithm, wherein the at least one of a second advance time and wait time is the second wait time and the at least one of a second advance time and second wait time computational algorithm is the second wait time computational algorithm.

* * * * *